United States Patent Office 3,558,650
Patented Jan. 26, 1971

3,558,650
PHTHALIMIDOMETHYL ISOTHIOCYANATE
Gerhard Zumach and Bertram Anders, Cologne-Stammheim, Ferdinand Grewe, Burscheid, Engelbert Kuhle, Bergisch Gladbach, and Helmut Kaspers, Leverkusen, Germany, assignors to Farbenfabriken Bayer Aktiengesellschaft, Leverkusen, Germany, a corporation of Germany
No Drawing. Filed May 16, 1968, Ser. No. 729,547
Claims priority, application Germany, June 13, 1967, F 52,666
Int. Cl. C07d 27/52
U.S. Cl. 260—326                                1 Claim

ABSTRACT OF THE DISCLOSURE

Phthalimidomethyl isothiocyanate which possesses fungicidal properties and which may be produced by reacting the corresponding N-chloromethyl-phthalimide, optionally in the presence of a solvent, with a compound which donates the thiocyanate group, e.g. trimethylsilyl isothiocyanate, and alkali metal and ammonium thiocyanates.

---

The present invention relates to and has for its objects the provision for the particular new isothiocyanate compound phthalimido methyl isothia cyanate which possesses fungicidal properties, active compositions in the form of mixtures of such compound with solid and liquid dispersible carrier vehicles, and methods for producing such cmpound and for using such compound in a new was especially for combating fungi, with other and further objects becoming apparent from a study of the within specification and accompanying examples.

It is already known that N-trichloromethylmercapto-4-cyclohexene - 1,2 - dicarboximide (A), N - trichloromethylthiophthalimide (B) as well as zinc ethylene-bis-dithiocarbamate (C) can be used for the control of phytopathogenic fungi (compare German Patents 921,290 and 976,686). All these compounds have attained a very great significance in practice.

It has been found in accordance with the present invention that the particular new isothiocyanate compound, i.e. phthalimidomethyl isothiocyanate having the formula

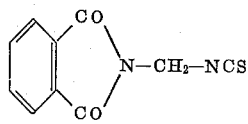

exhibits strong fungicidal properties.

It has been furthermore found in accordance with the present invention that a versatile and smooth process for the production of the particular new isothiocyanate of Formula I above in favorable yields may be provided, which comprises reacting N-chloromethyl-phthalimide having the formula

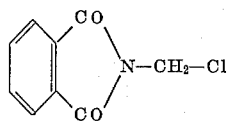

optionally in the presence of a solvent, with a compound (IIb) which donates the thiocyanate group.

Surprisingly, the phthalimidomethyl isothiocyanate of the present invention shows a higher fungicidal activity than the fungicidally active derivatives of phthalimide or tetrahydrophthalimide known from the prior art. The active compound of the invention therefore represents a significant enrichment of the art.

By way of illustration, if trimethylsilyl isothiocyanate is used as transmitter of the thiocyanate group, the course of the reaction can be represented by the following formula scheme:

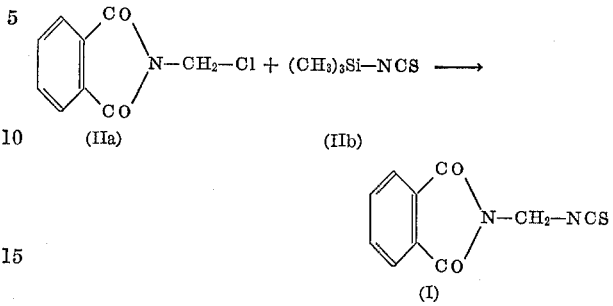

Examples of compounds (IIb) which donate the thiocyanate group are trimethylsilyl isothiocyanate, alkali metal thiocyanates, particularly potassium and sodium thiocyanate, and ammonium thiocyanate.

When trimethylsilyl isothiocyanate is used, the reaction is preferably carried out in the absence of a solvent and instead in excess trimethylsilyl isothiocyanate. In general, the reaction is carried out at a temperature of about 100 to 200° C., preferably at 140 to 170° C. The reaction can be carried out for example by heating the reaction components together in a distillation apparatus to 150–160° C. and, when the splitting off of trimethyl chlorosilane has ended, distilling off the excess trimethylsilyl isothiocyanate in a water-jet vacuum. The crystalline residue is the desired product in substantially pure form.

When an alkali metal or ammonium thiocyanate is used, the reaction is desirably carried out in the presence of a solvent. As solvent, there may be mentioned for example: hydrocarbons, such as benzene, toluene, etc.; chlorinated hydrocarbons, such as dichloroethane, chloroform, chlorobenzene, etc.; ethers, such as tetrahydrofuran, dioxan, etc.; and ketones, such as acetone, methylethyl ketone, etc. Acetone is a preferred solvent. In general, the reaction is carried out at about 50 to 150° C., preferably at the boiling temperature of the solvent. An excess of the thiocyanate reactant of up to about 100%, preferably 20–30%, has proved advantageous. The reaction time is usually about 5–50 hours, preferably 10–20 hours. The reaction can be carried out for example by adding the alkali metal or ammonium thiocyanate (for example potassium thiocyanate) to a solution of the N-chloromethylphthalimide, and heating the mixture to the boil for 10–20, for example 15, hours with stirring. Filtration while hot is then effected, and the filtrate is evaporated in a vacuum; the crystalline residue is normally recrystallized, for example from benzene/petroleum ether.

Advantageously, the instant active compound exhibits a strong fungitoxic activity. It shows a relatively low toxicity to warm-blooded animals and is therefore suitable for the control of undesired growth of fungi. Its good compatibility with higher plants permits its use as a plant protection agent against fungal plant diseases.

The instant active compound is particularly effective against parasitic fungi on above-the-soil parts of plants, such as *Phytophthora* species, *Fusicladium* species, *Peronospora* species and *Botrytis* species. However, it also acts very well against genuine mildew fungi such as *Podosphaera* species.

The active compound according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granules, etc. These are prepared in known manner, for instance by extending the active compound with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers including organic solvents, such as aromatic hydrocarbons (e.g. benzene, toluene, xylene, etc.), halogenated, especially chlorinated, aromatic hydrocarbons (e.g. chlorobenzenes, etc.) paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and water; as well as dispersible finely divided solid carriers, such as ground natural minerals (e.g. kaolins, alumina, silica, chalk, i.e., calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

Such active compound may be employed alone or in the form of mixtures with such solid or liquid dispersible carrier vehicles and/or with other known compatible active agents, especially plant protection agents, such as other fungicides, herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.0005–5%, preferably 0.001–1%, by weight of the mixture. Thus, the present invention contemplates over-all compositions which comprise mixtures of a dispersible carrier vehicle such as (1) a dispersible carrier solid, or (2) a dispersible carried liquid such as an organic solvent and/or water preferably including a carrier vehicle assistant, e.g. surface-active agent, such as an emulsifying agent and/or a dispersing agent, and an amount of the active compound which is effective for the purpose in question and which is generally about 0.0005–95%, and preferably 0.001–95% by weight of the mixture.

In particular, the present invention contemplates methods of selectively controlling or combating fungi, which comprises applying to at least one of (a) such fungi and (b) their habitat, a fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges, e.g. depending on the nature of the application and the species of fungus controlled.

The outstanding fungitoxic effectiveness of the instant compound, as well as the distinct superiority thereof compared with known products of analogous constitution and the same type of activity, can be seen, by way of illustration and without limitation, from the following experimental test results:

EXAMPLE 1

Fusicladium test (apple scab) [protective]

Solvent: 4.7 parts by weight acetone
Emulsifier: 0.3 part by weight alkylaryl polyglycol ether
Water: 95.0 parts by weight The amount of the particular active compound required for the desired concentration of such active compound in the spray liquid is mixed with the stated amount of solvent, and the resulting concentrate is diluted with the stated amount of water which contains the stated emulsier to provide the final lower concentration.

Young apple seedlings in the 4–6 leaf stage are sprayed (i.e. treated) with the spray liquid until dripping wet. The plants remain in a greenhouse for 24 hours at 20° C. and at a relative atmospheric humidity of 70%. They are then inoculated with an aqueous conidium suspension of the apple scab causative organism (*Fusicladium dentriticum* Fuckel) and incubated for 18 hours in a humidity chamber at 18–20° C. and at a relative atmospheric humidity of 100%.

The plants then again come into a greenhouse for 14 days.

15 days after inoculation, the infestation of the seedlings is determined as a percentage of the untreated but also inoculated control plants.

0% means no infestation; 100% means that the infestation is exactly as great as in the case of the control plants.

The particular active compounds tested, their concentrations and the results obtained can be seen from the following Table 1.

TABLE 1.—*FUSICLADIUM* TEST [PROTECTIVE]

| Active compound | Infestation in percent of [1]— | |
|---|---|---|
| | 0.0062 | 0.0031 |
| (A) 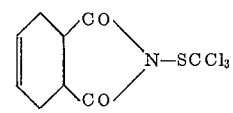 (known) | 17 | 31 |
| (I) 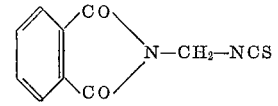 | 3 | 3 |

[1] As a percentage of the infestation of the untreated control with a concentration of active compound.

EXAMPLE 2

Fusicladium test (apple scab) [curative]

Solvent: 4.7 parts by weight acetone
Emulsifier: 0.3 part by weight alkylaryl polyglycol ether
Water: 95.0 parts by weight The amount of the particular active compound required for the desired concentration of such active compound in the spray liquid is mixed with the stated amount of solvent, and the resulting concentrate is diluted with the stated amount of water which contains the stated emulsifier to provide the final lower concentration.

Young apple seedlings in the 4–6 leaf stage are inoculated with an aqueous conidium suspension of the apple scab causative organism (*Fusicladium dendriticum* Fuckel) and incubated for 18 hours in a humidity chamber at 18–20° C. and at an atmospheric humidity of 100%. The plants are then placed in a greenhouse where they dry.

After standing for a suitable period of time, the plants are sprayed dripping wet (i.e. treated) with the spray liquid prepared in the manner described above. The plants then again are placed in a greenhouse.

15 days after inoculation, the infestation of the apple seedlings is determined as a percentage of the untreated but also inoculated control plants.

0% means no infestation; 100% means that the infestation is exactly as great as in the case of the control plants.

The particular active compounds tested, their concentrations, the period of time between inoculation and spraying and the results obtained can be seen from the following Table 2.

TABLE 2.—FUSICLADIUM TEST [CURATIVE]

| Active compound | Residence period in hours [1] | Infestation (in percent) of 0.1 [2] |
|---|---|---|
| (B) [phthalimide-SCCl₃ structure] (known) | 42 | 48 |
| (A) [tetrahydrophthalimide-SCCl₃ structure] (known) | 42 | 89 |
| (I) [phthalimide-CH₂NCS structure] | 42 | 37 |

[1] i.e. period between inoculation and spraying. Period between inoculation and spraying.
[2] As a percentage of the untreated control with a concentration of active compound.

The particular active compounds, their concentrations and the results obtained can be seen from the following Table 3.

TABLE 3.—PODOSPHAERA TEST [PROTECTIVE]

| Active compound | Infestation (in percent) of [1] | |
|---|---|---|
|  | 0.1 | 0.025 |
| (B) [phthalimide-SCCl₃ structure] (known) | 76 | 100 |
| (A) [tetrahydrophthalimide-SCCl₃ structure] (known) | 100 | 100 |
| (I) [phthalimide-CH₂-NCS structure] | 17 | 55 |

[1] As a percentage of the infestation of the untreated control with a concentration of active compound.

EXAMPLE 3

*Podosphaera* test (powdery mildew of apples) [protective]

Solvent: 4.7 parts by weight acetone
Emulsifier: 0.3 part by weight alkylaryl polyglycol ether
Water: 95.0 parts by weight The amount of the particular active compound required for the desired concentration of such active compound in the spray liquid is mixed with the stated amount of solvent, and the resulting concentrate is diluted with the stated amount of water which contains the stated emulsifier to provide the final lower concentration.

Young apple seedlings in the 4–6 leaf stage are sprayed (i.e. treated) with the spray liquid until dripping wet. The plants remain in a greenhouse for 24 hours at 20° C. and at a relative atmospheric humidity of 70%. They are then inoculated by dusting with conidia of the apple powder mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation; 100% means that the infestation is exactly as great as in the case of the control plants.

EXAMPLE 4

*Phytophthora* test

Solvent: 4.7 parts by weight acetone
Dispersing agent: 0.3 part by weight alkylaryl polyglycol ether
Water: 95.0 parts by weight The amount of the particular active compound required for the desired concentration of such active compound in the spray liquid is mixed with the stated amount of solvent, and the resulting concentrate is diluted with the stated amount of water which contains the stated dispersing agent to provide the final lower concentration.

Young tomato plants (Bonny Best) with 2–6 foliage leaves are sprayed (i.e. treated) with the spray liquid until dripping wet. The plants remain in a greenhouse for 24 hours at 20° C. and at a relative atmospheric humidity of 70%. The tomato plants are then inoculated with an aqueous spore suspension of *Phytophthora infestans*. The plants are brought into a moist chamber with an atmospheric humidity of 100% and a temperature of 18–20° C.

After 5 days the infestation of the tomato plants is determined as a percentage of the untreated but likewise inoculated control plants.

0% means no infestation; 100% means that the infestation is exactly as great as in the case of the control plants.

The particular active compounds tested, their concentaritons and the results obtained can be seen from the following Table 4.

TABLE 4.—PHYTOPHTHORA TEST

| Active compound | Infestation in percent of [1]— | |
|---|---|---|
| | 0.025 | 0.0062 |
| (B) [phthalimide N—SCCl₃] (known) | 13 | 26 |
| (A) [tetrahydrophthalimide N—SCCl₃] (known) | 12 | 26 |
| (C) [CH₂—NH—C(=S)—S]₂Zn (known) | 7 | 23 |
| (I) [phthalimide N—CH₂—NCS] | 2 | 15 |

[1] As a percentage of the untreated control with a concentration of active compound.

The process for producing the instant compound according to the present invention is illustrated, without limitation, by the following further examples.

EXAMPLE 5

750 g. (3.83 mols) of N-chloromethylphthalimide are heated together with 900 g. of trimethylsilyl isothiocyanate in a distillation apparatus (2-liter Neumann flask, 20 cm. column) with an oil bath of 160° C. bath temperature. At this temperature trimethylchlorosilane is split off, and it is distilled off into a receiver (414 g.).

The residue remaining behind is freed from excess trimethylsilyl isothiocyanate (375 g.) by distillation in a water-jet vacuum and crystallized after removal of the heating bath. The crude phthalimidomethyl isothiocyanate (830 g.) (99.5% of the theory) melts at 106–108° C. and can be recrystallized from benzene/petroleum ether. M.P. 114–116° C.

EXAMPLE 6

A mixture of 98 g. (0.5 mol) of N-chloromethylphthalimide in 300 ml. of acetone and 58 g. (0.6 mol) of potassium thiocyanate is heated to the boil for 15 hours. After filtration of the warm solution, the solvent is evaporated in a vacuum and the crystalline residue, which still contains a large amount of inorganic salts, is recrystallized from benzene/petroleum ether. 72 g. (66% of the theory) of phthalimidomethyl isothiocyanate are obtained. M.P. 112–115° C.

It will be realized by the artisan that the instant compound contemplated by the present invention possesses the desired strong fungicidal properties, with regard to a broad spectrum of activity, as well as a comparatively low toxicity toward warm-blooded creatures and a concomitantly low phytotoxicity, enabling such compound to be used with correspondingly favorable compatibility with warm-blooded creatures and plants for more effective control and/or elimination of fungi by application of such compound to such fungi and/or their habitat.

It will be appreciated that the instant specification and examples are set forth by way of illustration and not limitation, and that various modifications and changes may be made without departing from the spirit and scope of the present invention which is to be limited only by the scope of the appended claim.

What is claimed is:

1. Phthalimidomethyl isothiocyanate having the formula

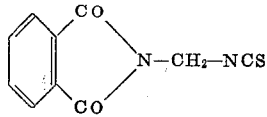

References Cited

UNITED STATES PATENTS

| 2,553,771 | 5/1951 | Kittleson et al. | 260—326 |
| 3,097,130 | 7/1963 | Regel et al. | 424—302 |
| 3,308,017 | 3/1967 | Knüsli et al. | 424—302 |
| 3,410,842 | 11/1968 | Allais et al. | 260—326X |

ALEX MAZEL, Primary Examiner

J. A. NARCAVAGE, Assistant Examiner

U.S. Cl. X.R.

424—274